No. 750,961. PATENTED FEB. 2, 1904.
D. R. GARDINER.
APPARATUS FOR PICKLING OR TREATING GRAIN WITH LIQUIDS.
APPLICATION FILED JUNE 9, 1902.
NO MODEL.
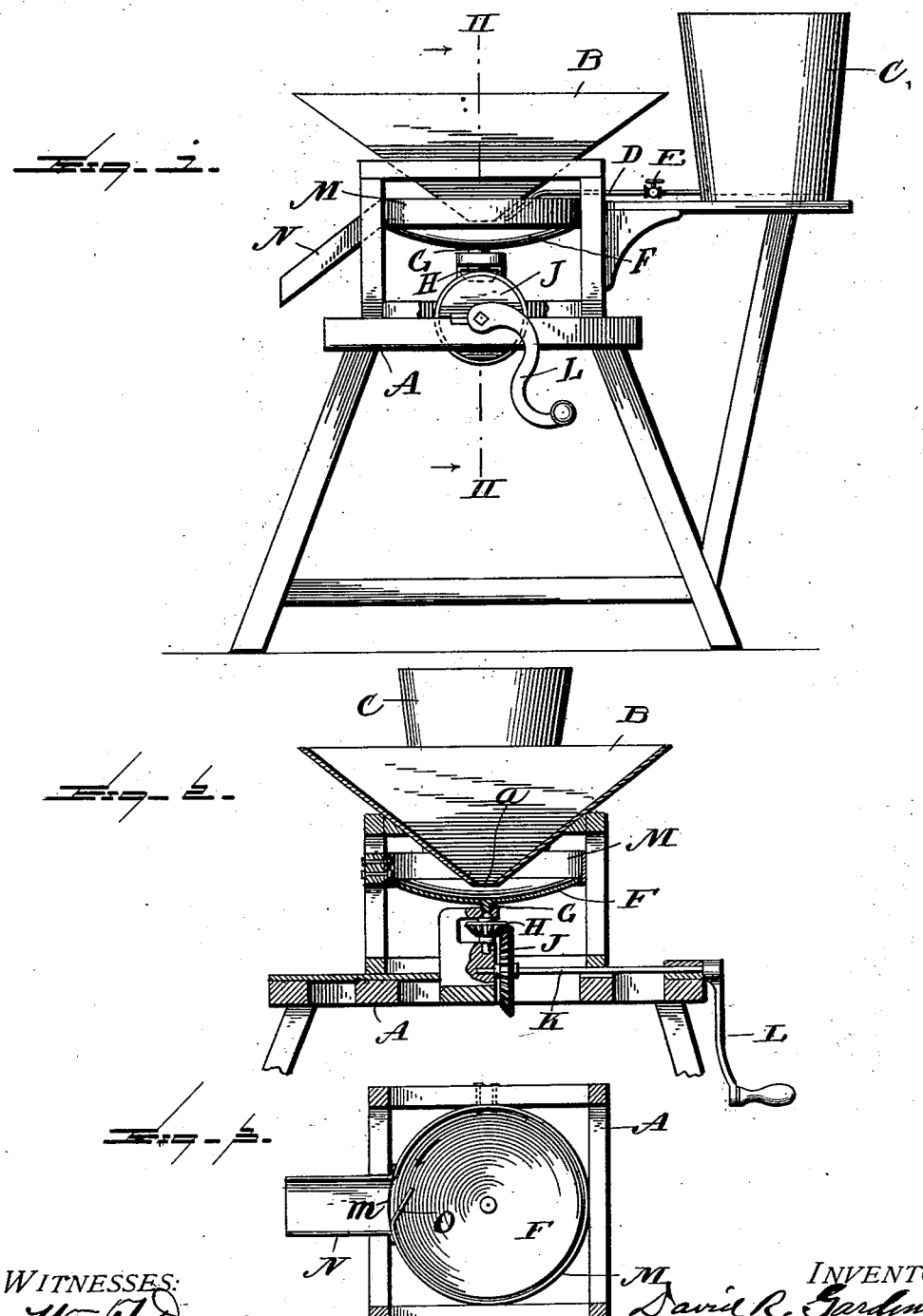

No. 750,961. Patented February 2, 1904.

UNITED STATES PATENT OFFICE.

DAVID R. GARDINER, OF NEEPAWA, CANADA.

APPARATUS FOR PICKLING OR TREATING GRAIN WITH LIQUIDS.

SPECIFICATION forming part of Letters Patent No. 750,961, dated February 2, 1904.

Application filed June 9, 1902. Serial No. 110,920. (No model.)

*To all whom it may concern:*

Be it known that I, DAVID R. GARDINER, a citizen of the Dominion of Canada, residing at Neepawa, in the Province of Manitoba, Canada, have invented certain new and useful Improvements in Apparatus for Pickling or Treating Grain with Liquids; and I do hereby declare the following to be a full, clear, and exact description of the invention, such as will enable others skilled in the art to which it appertains to make and use the same.

This invention relates to apparatus for treating grain with liquids or solutions for the purposes of damping, cleaning, removing smut and other deleterious matter, and particularly for "pickling" or treating seed-grain for destruction of smut-germs.

The primary object is to provide a simple and efficient machine for rapidly and thoroughly mixing the grain with the water or liquid solution in proper proportions, so that the grains may be uniformly dampened or impregnated by the liquid to the desired extent.

The invention will hereinafter be first fully described with reference to the accompanying drawings, which form a part of this specification, and then pointed out in the appended claims.

In said drawings, in which corresponding parts in the different views are designated by the same letters of reference, Figure 1 is a side elevation of an apparatus embodying my invention. Fig. 2 is a vertical section taken on line II II of Fig. 1, and Fig. 3 is a fragmentary plan view of the grain and liquid mixing disk.

The letter A in said drawings designates as a whole a suitable supporting-frame for the machine.

B denotes a hopper for the grain which is to be treated, and C denotes a tank or reservoir for the smut-germ-destroying solution or other liquid. The liquid-tank is provided with a discharge-pipe D, controlled by a valve E and having its outlet end in close proximity to the lower discharge-opening *a* of the hopper, as indicated by dotted lines in Fig. 1. A rotary mixing-diisk F is located below the hopper, with its center directly beneath the discharge-opening *a* thereof, so as to receive the discharge of grain from the hopper and liquid or solution from the tank. Said disk is shown mounted on a vertical spindle G, which is journaled in suitable bearings and provided with a bevel-pinion H in mesh with a bevel-gear J on a horizontal shaft K. The shaft K is provided with a crank L for operating the disk, which, however, may be rotated by any suitable means. The said disk may be flat or of any desired shape, but is preferably concave or saucer-shaped, as shown in Fig. 2. Inclosing the rim or outer edge of the disk is a fixed casing or ring M, provided with a suitable opening *m* and a spout N for delivery of grain from the disk after it has been treated by the liquid. The grain is directed into said spout by means of a scraper O, located at the edge of the disk at one side of the opening *m* and adapted to collect the grain from the surface of the disk as the latter rotates and to feed it into the spout, as will be obvious by reference to Fig. 3.

In operation the tank C first having been supplied with the germ-destroying solution or other liquid with which the grain is to be treated the grain is introduced into the hopper, and the valve E is opened or partially opened to permit discharge of said liquid in the desired proportion, which of course depends on the grain, the strength and properties of the liquid or solution, and the character of the treatment. The grain and liquid falling together into the disk F, at substantially the center thereof, are regularly driven by centrifugal force toward the periphery or against the fixed casing M, whereby the grain and liquid are spread out and evenly mixed together, so that the grains are uniformly impregnated or acted upon by the liquid or solution. As the disk rotates the grain is collected by the scraper and directed into the spout N in an obvious manner.

The apparatus is susceptible of various modifications in details of construction and arrangement without departing from the scope of my invention.

Having thus fully described my invention, what I claim as new, and desire to secure by Letters Patent of the United States, is—

1. In a machine for treating grain with pickling or preserving liquids, a horizontal rotary mixing-disk having a smooth continuous or unbroken concave surface, means for rotating the same, and a grain-hopper and liquid-reservoir having their discharge-openings in close proximity immediately above the axial center of the disk so as to discharge together onto said center.

2. In a machine for treating grain with pickling or preserving liquids, a vertical spindle and means for rotating the same, a horizontal mixing-disk mounted thereon having an upper plain concave surface, and a grain-hopper and liquid-reservoir having their discharge-openings in close proximity immediately above the axial center of the disk.

3. In a machine for treating grain with pickling or preserving liquids, a horizontal rotary mixing-disk having a smooth continuous or unbroken concave surface, means for rotating the same, a grain-hopper having its discharge-opening immediately above the axial center of the disk, a liquid-reservoir having a discharge-pipe with its outlet also directed immediately above the center of the disk, whereby the grain and liquid discharge together onto the center of the disk, and a valve in said pipe for controlling the discharge of liquid.

4. In a machine for dampening or impregnating grain with liquids, a horizontal rotary mixing-disk having a smooth continuous or unbroken concave surface, means for rotating the same, means for continuously feeding the grain and the liquid or solution onto said disk, a fixed circular casing fitting closely around the periphery of the disk and having a lateral discharge-opening, and a scraper located within the casing near the periphery of the disk for directing the grain through said discharge-opening.

In testimony whereof I affix my signature in presence of two witnesses.

DAVID R. GARDINER.

Witnesses:
D. S. McELROY,
DELBERT THURSTON.